United States Patent [19]

Jones

[11] 4,112,207
[45] Sep. 5, 1978

[54] RADIATION-CURABLE POLYMERS BEARING QUATERNARY NITROGEN GROUPS

[75] Inventor: Giffin D. Jones, Midland, Mich.

[73] Assignee: The Dow Chemical Company, Midland, Mich.

[21] Appl. No.: 737,240

[22] Filed: Oct. 29, 1976

[51] Int. Cl.$^2$ .......................... C08F 8/32; C08F 8/30
[52] U.S. Cl. ........................................ 526/17; 96/36.3; 101/395; 204/159.2; 427/44; 427/54; 526/49; 526/52.2; 526/52.3; 526/217; 526/293; 526/295
[58] Field of Search .................... 526/17, 18, 49, 292, 526/293, 295; 204/159.14, 159.15, 159.17, 159.18, 159.2

[56] References Cited

U.S. PATENT DOCUMENTS

| | | | |
|---|---|---|---|
| 2,810,713 | 10/1957 | Melamed | 526/264 X |
| 2,980,634 | 4/1961 | Melamed | 526/292 |
| 3,557,063 | 1/1971 | D'Alelio | 526/49 X |
| 3,678,098 | 7/1972 | Lewis | 526/292 |
| 3,709,690 | 1/1973 | Cohen | 96/67 |
| 3,799,915 | 3/1974 | Dunnavant | 526/321 |

Primary Examiner—Christopher A. Henderson, Jr.
Attorney, Agent, or Firm—J. B. Guffey

[57] ABSTRACT

Polymers, such as butadiene copolymers and isoprene copolymers, having pendant unsaturated tetra-aliphatic quaternary nitrogen moieties, such as those derived from acrylic esters and acrylamides are useful as water-soluble or inherently water-dispersible curable coatings such as protective and/or decorative coatings, paper coatings, textile fiber coatings, printing plates, photo-curable imagable materials useful as photo-resists, lithographic plates, etc., and the like. Such coatings are curable with light, with high energy radiation and with heat in the presence of free radical catalysts to form insoluble, crosslinked coatings.

16 Claims, No Drawings

RADIATION-CURABLE POLYMERS BEARING QUATERNARY NITROGEN GROUPS

BACKGROUND OF THE INVENTION

In one aspect this invention relates to curable compositions. In another aspect this invention relates to radiation-curable addition polymers having pendant acryloyl unsaturation. In yet another aspect this invention relates to water-soluble radiation-curable addition polymers having pendant acryloyl unsaturation.

Curable compositions are often useful as protective and/or decorative coatings, paper coatings, etc. Photo-curable coatings are especially useful in the preparation of photo-imagable printing materials such as photo-resists and lithographic plates.

Compositions which are curable or polymerizable by virtue of the presence of acryloyl unsaturation are well known in the prior art. However such prior art compositions often exhibit deficiencies in various physical properties which make them undesirable for certain practical applications. The most common deficiency of the prior art compositions is that they are generally not water soluble and thus often require the use of organic solvents for the deposition of a curable film or layer. Further, in the case of photo-imagable coatings of such compositions, organic solvents, which are expensive or flammable or toxic, are generally required to dissolve the unexposed portion of the coating from the cured image forming portion.

While the requirement of an organic solvent in the formation of a curable coating or film from a water-insoluble composition can in some applications be eliminated or minimized by deposition of the curable coating composition from an aqueous emulsion or dispersion, problems with stability of such emulsions or dispersions over time and under various storage conditions often arise. Thus additives such as emulsifiers and dispersing agents are generally required for the initial formation and the stabilization of such aqueous emuslions or dispersions. Furthermore, photo-imagable printing materials made by deposition of a film of a water-insoluble photo-imagable composition from an aqueous emulsion or dispersion still generally require the use of organic solvents to develop the imaged coating (i.e., to dissolve the unexposed portions) after exposure through a negative to crosslink and thereby insolubilize the exposed portions.

Polymers having pendant unsaturated quaternary nitrogen moieties have been reported. See, for example, Jones et al., *Journal of Applied Polymer Science*, Vol. V, No. 16, Pages 452–459 (1961) and Dzhalilov et al., Uzb. Khim. Zh., 18(1), Pages 56–59 (1974). However, such prior art polymers do not appear to be suitable as the photo-curable layer of photo-imagable articles by virtue of relatively slow photo-polymerization of the pendant vinyl groups there involved.

Water-soluble photo-imagable compositions have been reported. See, for example, U.S. Patents 3,628,963; 3,794,494; and 3,801,328. However, such prior art water-soluble curable compositions are often less than totally satisfactory as photo-imagable printing materials by virtue of excessive light exposure requirement. In addition, such compositions often exhibit relatively limited water solubility so that long development times, large amounts of water and/or the use of heated water in the development process are required.

Another problem encountered with some of the prior art curable coating compositions (both water soluble and water insoluble) is that, after curing, the coatings thus formed are brittle. This often leads to cracking, crazing, chipping or peeling of the coating when the coated substrate is thermally expanded and contracted and when the coated substrate is impacted with other articles.

Other problems encountered with prior art curable compositions (particularly in photo-imagable printing applications) include (a) poor photosensitivity, (b) slow cure times, (c) liquidity or tackiness of the uncured compositions, (d) gradual embrittlement of the cured and uncured compositions during storage at normal room humidities, (e) distortion of small features (which receive only small radiation doses during exposure through a negative) by virtue of swelling during the developemnt (i.e., washout) process, (f) excessive drying time requirements after development of imaged articles, and (g) poor adhesion of coatings to substrate.

In view of the aforementioned deficiencies with the prior art coating compositions, it would be highly desirable to provide curable coating compositions which are either water soluble or which form stable aqueous dispersions or emulsions without the need for separate dispersing agents or emulsifiers (i.e., which are at least inherently water dispersible). Further it would be highly desirable to provide curable compositions which are initially flexible and resilient and which retain their flexibility and resiliency (before and after curing) during prolonged storage at various humidities. In addition, it would be highly desirable to provide curable compositions (a) which feature rapid cure times, (b) which are not tacky prior to curing, (c) which are readily developed with water or dilute aqueous alcohol solutions after exposure of a film of such composition through a negative, (d) which do not swell during development of the exposed image, (e) which possess fast drying characteristics, and (f) which exhibit good adhesion to a variety of potential substrate materials.

SUMMARY OF THE INVENTION

The present invention is a new class of radiation-curable polymers which comprise a base polymer having pendantly bonded thereto, per gram of said radiation-curable polymer, from about 0.4 to about 3 milliequivalents of quaternary nitrogen in the form of a moiety of the formula

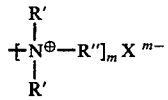

wherein each R' is individually a lower alkyl radical (e.g. methyl ethyl, propyl, etc.) or a lower hydroxyalkyl radical (e.g. 2-hydroxyethyl, 2-hydroxypropyl, 3-hydroxypropyl, etc.) or two R' radicals collectively are a divalent radical (e.g., $-(CH_2)_4-$, $-(CH_2)_5-$, $-CH_2-O-(CH_2)_2-$, $-(CH_2)_2O-(CH_2)_2-$, etc.) that is joined with the nitrogen atom to form a 5 or 6 membered heterocyclic ring which may contain an atom of oxygen non-adjacent to the nitrogen atom; each R" is individually a lower alkyl, a lower hydroxyalkyl radical or an unsaturated organic radical of the formula:

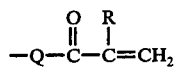

wherein R is hydrogen or methyl and Q is a divalent aliphatic radical; X is a neutralizing inorganic anion, a neutralizing saturated organic anion or a neutralizing α,β-ethylenically unsaturated organic anion; and m is 1 or 2; with the proviso that either R" is said unsaturated organic radical or X is said neutralizing α,β-ethylenically unsaturated organic anion.

The curable polymers of the invention, both before and after curing, form tough flexible and resilient coatings. Toughness is a particularly desirable characteristic for coatings using the polymers of the invention as it imparts abrasion and impact resistance to the coating. Flexibility and resiliency are particularly advantageous in photo-imagable materials as such properties allow an imaged coating to conform to surface irregularities of an article to which the image is being transferred by means of deposition of ink from the imaged coating to such article. Further, the flexibility, resiliency and toughness of the curable polymers of the invention is not adversely affected by prolonged exposure to a wide range of humidities at normal room temperature.

In addition, the uncured radiation-curable polymers of the invention generally form solid non-tacky film surfaces and are characterized by rapid photocuring.

Surprisingly, photo-imagable coatings produced from the curable polymers of the invention are not adversely affected by the presence of oxygen during photocuring operations. Thus, there is no need to photocure such polymers in a vacuum nor is pre-exposure of the polymer without the negative necessary to consume oxygen.

Such new curable polymers are at least inherently water dispersible (preferably water soluble) and are useful in water-based coating applications such as protective and/or decorative coatings for metals, wood, etc; paper coatings, and photo-imagable coatings (e.g., photoresists, lithographic plates, etc.), As used herein the phrase "at least inherently water dispersible" means that the polymers are either water soluble or inherently water dispersible. The phrase "inherently water dispersible" means that the polymers form stable aqueous emulsions or dispersions without the aid of separate surfactants, emulsifiers or dispersing agents.

The water-soluble curable polymers of the invention are particularly useful in the preparation of photo-imagable coatings as the water solubility of the uncured polymer permits development of an exposed coating of such polymer with water or dilute aqueous alcohol solutions in place of relatively more expensive and potentially flammable or otherwise hazardous organic solvents.

The term "water soluble" as used herein means that the polymer thus referred to is miscible with, or soluble in, water in all proportions.

The term "photo-imagable coatings" refers to polymeric layers or films which are rendered insoluble by crosslinking on exposure to light or high energy radiation such that after exposure through a negative the unexposed portions can be dissolved away leaving insoluble cross-linked portions forming an image corresponding to that of the transparent portion of the negative.

DETAILED DESCRIPTION OF THE INVENTION

The preferred radiation-curable polymers of the invention are base polymers having pendantly bonded thereto, per gram of said radiation-curable polymer, from about 0.4 to about 3, preferably from about 1 to about 3, more preferably from about 1.5 to about 3, most preferably between about 1.5 and about 2.5, milliequivalents of quaternary nitrogen in the form of a moiety of the formula I

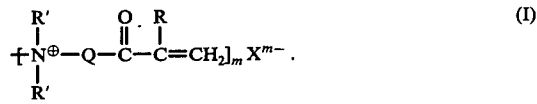

In the moiety of the formula I, R is hydrogen or methyl; the R' radicals are (individually or collectively) as hereinbefore defined, preferably each R' radical is individually a lower alkyl radical such as methyl, ethyl, propyl, etc., more preferably methyl or ethyl, most preferably methyl; X is a neutralizing inorganic, anion (e.g., halogen, phosphate, sulfate, nitrate, etc.) or a saturated organic anion (e.g., acetate, citrate, etc.); and m is 1 or 2, preferably 1. Preferably the anion X is halogen, more preferably chlorine or bromine, most preferably chlorine and accordingly m is 1. The radical Q is a divalent aliphatic radical which preferably contains from 1 to about 6 carbon atoms. Representative divalent aliphatic radicals include, for example, those of the following formulas: $+CH_2+_n$, $+CH_2+_nCH_2-NH-$, $+CH_2+_nCH_2-O-$, $-CH_2-CH+OH+CH_2-NH-$, $+CH_2+_nCH_2-O-CH_2(CH_2+_nNH-$, $-CH_2-CH=CH-CH_2-$ and $-CH_2-CH(R)-C(O)-NH-CH_2-NH-$ wherein $n$ is a postive integer, preferably from 1 to about 6, and R is hydrogen or methyl. More preferably the radical Q is a divalent radical of the formula

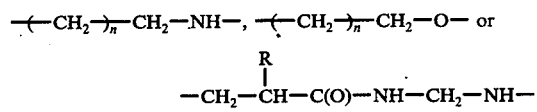

wherein $n$ is a positive integer, preferably from 1 to about 6, more preferably 1 or 2, most preferably 1, and R is hydrogen or methyl. Most preferably Q is a divalent radical of the formula $+CH_2+_nCH_2-NH$ wherein $n$ is a positive integer, preferably from 1 to about 6, more preferably 1 or 2, most preferably 1.

Other radiation-curable polymers of the invention are base polymers having pendantly bonded thereto, per gram of said radiation-curable polymer, from about 0.4 to about 3, preferably from about 1 to about 3, more preferably from about 1.5 to about 3, most preferably from about 1.5 to about 2.5 milliequivalents of quaternary nitrogen in the form of a moiety of the formula II

wherein R' is as hereinbefore defined for moieties of the formula I, R" is a lower alkyl radical or a lower hydroxyalkyl radical, preferably a lower alkyl radical (especially methyl or ethyl, most preferably methyl); $m$ is 1 or 2, preferably 1; and X is a neutralizing $\alpha,\beta$-ethylenically unsaturated organic anion such as an anion of an $\alpha,\beta$-ethylenically unsaturated carboxylic acid (e.g., acrylic acid, methacrylic acid, $\alpha$-chloroacrylic acid, itaconic acid), anions of esters or amides of such acids with, respectively, sulfoalkyl alcohols (e.g., 3-hydroxypropyl sulfonic acid) or sulfoalkyl amines (e.g., 2-aminoethyl sulfonic acid), mono-esters of dicarboxylic acids (e.g., adipic, oxalic, phthalic, sebacic, maleic, etc.) with hydroxyalkyl acrylates and methacrylates (e.g., 2-hydroxyethyl acrylate, 2-hydroxyethyl methacrylate, etc.) and similar monovalent or divalent $\alpha,\beta$-ethylenically unsaturated organic anions. Preferably, in the moiety II, X is the monovalent anion of acrylic or methacrylic acid and accordingly $m$ is 1.

In the preparation of the radiation-curable polymers of the invention, it is convenient to first prepare a base polymer by the addition polymerization of an olefin monomer with an active halogen monomer and then to aminate the resulting active halogen monomer moiety.

To obtain the pendant moiety of the formula I, an unsaturated tertiary amine, such as those described hereinafter, is employed in the amination reaction.

To obtain the pendant moiety of the formula II a saturated tertiary amine, such as those described hereinafter, is employed in the aminiation reaction. The aminated base polymer is then treated, pursuant to conventional anion exchange techniques, with a strong base anion exchange resin to replace the resulting halogen anion (from the active halogen monomer) with the chosen neutralizing $\alpha,\beta$-ethylenically unsaturated organic anion.

Olefin monomers suitable for use in the preparation of the aforementioned base polymers preferably contain from 3 to 5 carbon atoms. Examples of such olefins include alkenes such as propylene, 1-butene, isobutylene, 1-pentene, etc., and alkadienes such as 1,3-butadiene, 2-halomethyl-1,3-butadiene, isoprene and the like. Alkadienes containing 4 or 5 carbon atoms are especially preferred because of the elastomeric nature of copolymers prepared therefrom.

Suitable active halogen monomers include any addition polymerizable ethylenically unsaturated monomer which after polymerization provides a pendant halomethyl group capable of being aminated by a tertiary amine. Examples of such active halogen monomers include ortho-, meta- or para-(preferably meta- or para- or mixtures thereof) vinylbenzyl halides; o-, m-, or p-isopropenylbenzyl halides (preferably the meta- or para-isomers or mixtures thereof) and 2-halomethyl-1,3-butadienes. Those active halogen monomers wherein the halogen is chlorine or bromine, especially chlorine, are preferred.

Optionally the base polymer can contain a minor amount (e.g., from zero to about 20, preferably from zero to about 10, weight percent based upon the total elastomer weight) of other ethylenically unsaturated monomers such as styrene, acrylonitrile, acrylic acid, methacrylic acid, esters of acrylic or methacrylic acid (e.g., alkyl esters, hydroxyalkyl esters, aminoalkyl esters, sulfoalkyl esters, etc.), acrylamides, methacrylamides, and the like.

The amount of the aforementioned olefin monomer employed in the base polymer can vary so long as the finished curable polymer possesses the desired degree of toughness, flexibility and resiliency. However, as a general rule, base polymers containing at least about 40, preferably at least about 50, weight percent olefin monomer based upon the total weight of the base polymer are advantageously employed.

Naturally, when the polymerized active halogen monomer is itself olefinic, such as is the case for 2-halomethyl-1,3-butadiene, other olefin monomers such as those defined hereinbefore need not be employed in the base polymer. Thus, it is apparent that the base polymer can be a homopolymer of an olefinic active halogen monomer (e.g., 2-halomethyl-1,3-butadiene) or copolymer of such olefinic active halogen monomer with other of the aforementioned active halogen monomers or with the optionally employed other ethylenically unsaturated monomers such as those mentioned hereinbefore.

The amount of the aforementioned active halogen monomer employed in the base polymer can vary so long as sufficient pendant halomethyl groups are present after polymerization to provide the desired degree of water solubility after amination and the desired degree of crosslinking after curing. However, as a general rule base polymers containing between about 0.6 and about 6 milliequivalents of polymerized active halogen monomer moiety per gram of base polymer are advantageously employed in the curable polymers of the invention which are at least inherently water dispersible. For the water-soluble curable polymers of the invention base polymers containing between about 2.4 and about 6 milliequivalents of polymerized active halogen monomer moiety per gram of base polymer are advantageously employed.

Thus, for example, copolymers containing from about 40 to about 90 percent by weight of the aforementioned olefin monomers and from about 10 to about 60 percent by weight of the aforementioned active halogen monomers are advantageously employed as the base polymers for radiation curable polymers of the invention which are at least inherently water dispersible.

Similarly, copolymers containing from about 40 to about 60 weight percent of the aforementioned olefin monomers and from about 40 to about 60 weight percent of the aforementioned active halogen monomers are advantageously employed in the radiation curable polymers of the invention which are water soluble.

The molecular weight of the base polymers used in the practice of the invention are not particularly critical so long as it is high enough to provide sufficient strength and toughness to both cured and uncured coatings of the curable polymer obtained after amination. For the end uses such as curable protective coatings and photo-imagable coatings, base polymers having weight averaged molecular weights as low as about 5,000, preferably about 10,000, are advantageously employed. For uses as protective and/or decorative coatings there is no critical upper limit on the molecular weight so long as the uncured aminated polymer is water soluble or inherently water dispersible and can be readily coated from high solids (e.g., from about 30 to about 50 weight percent curable polymer) solutions or dispersions. Thus, for example, base polymers having weight averaged molecular weights as high as about 250,000, preferably about 100,000, most preferably about 50,000, or more are advantageously employed for protective and/or decorative coating application.

However, for use as radiation-curable photo-imagable printing surfaces excessively high molecular weight can cause curing in unexposed areas of the printing plate surface which can result in defects in the developed plate such as plugging of shadow dots. Thus, as a general rule base polymers intended for use in photo-imagable coating surfaces advantageously have weight averaged molecular weights between about 5,000 and about 50,000, preferably between about 5,000 and about 35,000, most preferably between about 10,000 and about 35,000. Such preferred low molecular weight (i.e., from about 5,000 to about 35,000 on a weight averaged basis) polymers are hereinafter also referred to as mesonomers.

In the preparation of the aforementioned base polymers conventional polymerization techniques are employed. Thus, for example, bulk, precipitation, solution, suspension or emulsion polymerization can be employed to first prepare the desired base polymer which is capable of subsequent amination.

For polymerization of the aforementioned alkadiene olefin monomers with the active halogen monomer, free radical polymerization (using azo catalysts, peroxide catalysts, light, or high energy radiation) or cationic polymerization (using Friedel Crafts catalysts such as boron trifluoride) can be employed. Free radical polymerization is preferred for such alkadiene monomers.

In the polymerization of olefin monomers such as propylene, isobutylene, 1-butene, 1pentene, etc. conventional cationic polymerization using Friedel Crafts catalysts such as boron trifluoride is advantageously employed.

For a given combination of monomers and for given desired molecular weight ranges, one of the aforementioned polymerization methods may be preferable to another and/or optimum polymerization parameters, such as oil to water ratio, or polymerization aids, such as chain transfer agents, may vary. Thus, for example, in the preparation of base polymers wherein the olefin is butadiene, the polymerization in solution and in suspension is generally slow and often results in low conversion. In addition, emulsion polymerization using conventional chain transfer agents such as dodecyl mercaptan is not suitable for preparation of butadiene-containing mesomers (i.e., polymers in the preferred 5,000–35,000 weight averaged molecular weight range). Thus, as far as is known, butadiene homopolymers and copolymers in such molecular weight range have not been known or prepared heretofore.

The use of aromatic mercaptans such as benzyl mercaptan, 4-chlorobenzyl mercaptan and 2,4-dichlorobenzyl mercaptan as chain transfer agents in emulsion polymerization has now been found to provide such desirable low molecular weight (e.g. from about 5,000 to about 35,000 on a weight average basis) while maintaining fast reaction rates and good conversion.

While generally limited to low conversions, butadiene copolymers of desirably low molecular weight can also be prepared by emulsion polymerization with conventional chain transfer agents by using a high oil to water ratio (e.g., about 7:1). In such process the polymerization mixture often undergoes inversion (from a water-in-oil to an oil-in-water system) during the course of the polymerization.

In addition, suitably low molecular weight base polymers can be obtained by scission of corresponding high molecular weight polymers by exposure of a solution of such high molecular weight polymers to ozone.

Following preparation of the base polymer, the base polymer is aminated either with an unsaturated tertiary amine to form the aforementioned pendant moiety of the formula I or with a saturated tertiary amine which, after subsequent anion exchange with suitable unsaturated organic acid anion forms the pendant moiety of the formula II.

Unsaturated tertiary amines suitable for aminating the polymerized active halogen moiety of the base polymer to form the aforementioned moiety of the formula I include those of the formula

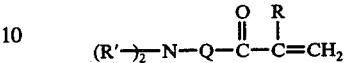

wherein Q, R and R' are as hereinbefore defined.

Representative of the aforementioned unsaturated tertiary amines are tertiary-amino-alkyl- (or -hydroxyalkyl- or -alkyloxyalkyl-) acrylamides such as N-(2-dimethylaminoethyl)acrylamide, N-(3-diethylamino-2-hydroxypropyl)acrylamide, N-(2-(2-dimethylaminoethoxy)ethyl)acrylamide, N-(6-(2-hydroxyethyl)methylaminohexyl)acrylamide, N-(2-(1-pyrrolidinyl)ethyl)acrylamide, N-(2-(1-piperidinyl)ethyl)acrylamide, etc.; tertiary-amino-alkyl-(or-hydroxyalkyl- or alkyloxyalkyl-)methacrylamides such as N-(2-(dimethylamino)ethyl)methacrylamide, N-(3-(2-hydroxypropyl)methyl)methacrylamide, N-(2-(thylamino-2-hydroxypropyl)-methacrylamide, N-(2-(dimethylaminoethoxy)ethyl)-methacrylamide, etc.; tertiary-amino-alkylacrylates such as 2-(dimethylamino)ethyl acrylate, 4-diethylamino butyl acrylate, etcl; tertiary-aminoalkylmethacrylates such as 2-(dimethylamino)ethyl methacrylate, 3-(dimethylamino)propyl methacrylate, 2-(1-morpholinyl)ethyl methacrylate, etc; tertiary-amino-alkyl-(or- alkenyl-) vinyl ketones such as 1-dimethylamino-3-buten-2-one, 2-(dimethylamino)ethyl vinyl ketone, 2-(dimethylamino)-isopropyl isopropenyl ketone, etc; tertiary-amino derivatives of methylene bis(acrylamides) or (methacrylamides) such as N-(3-(dimethylamino)propionamido)-methylacrylamide, N-(3-(dimethylamino)isobutylamido)-methylmethacrylamide, etc.; and the like.

Suitable saturated tertiary amines for forming moieties of the formula II include those of the formula

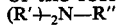

wherein R' is as hereinbefore defined and R" is a lower alkyl radical or a lower hydroxyalkyl radical, preferably a lower alkyl radical especially methyl or ethyl, most preferably methyl. Examples of such saturated tertiary amines include trimethylamine, dimethylethylamine, diethylmethylamine, N-methylpyrrolidine, N-ethylpiperidine, N-methylmorpholine, 2-hydroxyethyldimethylamine, 2-hydroxypropyldimethylamine, and the like.

Naturally after amination, the anion of the resulting quaternary nitrogen moiety is the halogen of the active halogen monomer moiety of the base polymer. To prepare the radiation-curable polymers of the invention having pendant moiety I wherein the anion X is other than a halogen atom, conventional anion exchange techniques can be employed. Similarly, to prepare the radiation curable polymers having pendant moiety II, the halogen anion is exchanged with chosen α, β-ethylenically unsaturated organic anion pursuant to conventional anion exchange techniques.

The extent of amination (and subsequent anion exchange in the case of pendant moieties of the formula (II)) of the base polymer is not particularly critical so long as a sufficient portion of the active halogen moieties have pendantly bonded thereto a previously defined moiety, I or II, to provide the desired degree of water dispersibility or water solubility and the desired degree of crosslinking upon curing.

In instances where a high degree of water solubility is desired but only a slightly crosslinked cured polymer is desired, a portion of the active halogen monomer moieties of the base polymer can be aminated with a non-curable tertiary amine (e.g., trialkyl amine, aryl dialkyl amine, alkyl diaryl amine, and the like) to form non-polymerizable solubilizing quaternary nitrogen moieties while the remainder are aminated with an aforementioned unsaturated tertiary amine to form the pendant moiety I. Similarly, for the pendant moiety II, amination solely with the aforementioned saturated tertiary amines with incomplete anion exchange with the chosen neutralizing $\alpha,\beta$-ethylenically unsaturated organic anion can be employed.

Naturally when a high degree of crosslinking is desired in the cured polymer essentially all of the active halogen monomer moieties of the base polymer are desirably aminated or aminated with subsequent anion exchange to form the aforementioned pendant moieties, I or II.

Regardless of whether the active halogen monomer moieties of the base polymer have been completely or only partially provided with quaternary nitrogen moieties and regardless of whether such moieties are all, or only partially, polymerizable (i.e., moieties of the formula I or II), it has been found that the radiation-curable polymers having at least about 1.5 milliequivalents of quaternary nitrogen moiety per gram of the curable polymer are generally water soluble. Those polymers of the invention having between about 1.0 and about 1.5 milliequivalents of quaternary nitrogen moiety per gram of the curable polymer are generally soluble in dilute aqueous alcohol solutions and are generally readily dispersible in water alone. Those radiation-curable polymers of the invention having between about 0.4 and about 1.0 milliequivalents per gram of quaternary nitrogen moiety are generally inherently dispersible in water but are not generally soluble in water or dilute aqueous alcohol solutions.

Amination of the hereinbefore described base polymers with the aforementioned (unsaturated, saturated or non-curable) tertiary amines is conveniently performed pursuant to conventional amination techniques such as those of the Menshutkin reaction. Suitable amination procedures are also illustrated by U.S. Pat. No. 3,544,532; U.S. Patent 3,673,164; Jones et al., *Journal of Applied Polymer Science,* Vol. V, No. 6, p. 455 (1961); and Jones, *Industrial and Engineering Chemistry,* Vol. 44, No. 11, pp. 2688–2690 (November 1952).

Such amination procedure generally entails reacting the base polymer with the tertiary amine in a common solvent (i.e., a solvent in which both the base polymer and the tertiary amine is soluble) such as dioxane or a dioxane-alcohol mixture. The amination is advantageously performed at temperatures between about 20° and about 60° C. The use of a small amount of a polymerization inhibitor in the amination reaction or conducting the amination reaction in the presence of oxygen and in antioxidant such as a diaryl amine (e.g., diphenyl amine, etc.) is generally desirable in order to eliminate or minimize polymerization of unsaturated tertiary amine reactant during amination of the base polymer to form pendant moieties of the formula I.

As amination progresses, partially aminated base polymer may become insoluble in the commmon solvent and precipitate from solution. At that point water can be added to redissolve the precipitated partially aminated base polymer into the liquid phase so that further amination proceeds at an acceptable rate. However, when a tertiary amine is employed which exhibits significant hydrolysis in the presence of water (e.g., tertiary aminoalkyl-acrylates and -methacrylates), the presence of significant amounts of water during amination is generally undesirable. In such case amination is preferably performed under essentially anhydrous conditions. Amination under such conditions generally requires longer reaction time by virtue of the reduced amination rate at the solid-liquid interface of the precipitated, partially aminated base polymer as contrasted to the liquid phase amination rate.

Determination of the degree of amination is conveniently achieved pursuant to conventional techniques such as titration with silver nitrate to determine the halogen anion content per gram.

After the desired degree of amination has been reached, the resulting aminated polymer is advantageously either reprecipitated from aqueous solution with a suitable organic solvent such as acetone to separate it from any excess tertiary amine. Alternatively, the pH of an aqueous solution of the curable polymer is adjusted to neutral (pH=7) or slightly acidic (e.g., pH = 5 or 6) to neutralize any excess tertiary amine. Then any necessary anion exchange (e.g., to form moieties of the formula II) or desirable anion exchange (e.g., to replace the halogen anion of polymerizable moieties of the formula I or of non-polymerizable solubilizing quaternary nitrogen moieties with other neutralizing anions) can be conveniently performed pursuant to conventional anion exchange techniques.

The radiation-curable polymers of the invention are useful as paper coatings, protective or decorative coatings for wood, metal etc., and as the image-forming surfaces of photo-imagable printing materials such as printing plates (e.g., photoresists, lithographic plates, etc.).

The radiation-curable polymers of the invention employing the hereinbefore-described base polymers ranging from low weight averaged molecular weights (e.g., about 5,000) to high weight averaged molecular weights (e.g., 250,000, preferably 100,000, most preferably 50,000) and having a relatively low (saturated or unsaturated) quaternary nitrogen content (e.g., from about 0.4 to about 1.5, especially from about 0.4 to about 1.0, milliequivalents per gram of such radiation-curable polymer) are particularly useful in protective coating applications.

The radiation-curable polymers of the invention employing relatively low molecular weight base polymers (e.g., from about 5,000 to about 50,000, preferably from about 5,000 to about 35,000, most preferably from about 10,000 to about 35,000, on a weight averaged basis) are particularly useful as photo-imagable printing materials.

Such low molecular weight radiation-curable polymer having relatively high quaternary nitrogen content (e.g., from about 1.5 to about 3, preferably from about 1.5 to about 2.5, milliequivalents per gram of such radiation-curable polymer) are particularly useful as photo-imagable printing materials for photoresists and positive-acting lithographic plates.

The aforementioned low molecular weight radiation-curable polymers having relatively low (saturated or unsaturated) quaternary nitrogen content (e.g., from about 0.4 to about 1.5, especially from about 0.4 to about 1.0, milliequivalents per gram of such radiation-curable polymer) are particularly useful as photo-imagable printing materials for negative-acting lithographic plates.

In the use of the polymers of the invention as protective or decorative coatings for metals such as iron, steel, etc., the halide ion of the moieties of the formula I as initially formed by amination can be detrimental from a corrosion standpoint. Thus, for use as protective or decorative coatings for metals or when metal plates comprise a substrate for photo-imagable printing materials neutralizing anions other than halogens (e.g., phosphate, nitrate, acetate, and similar neutralizing anions) are preferred. Accordingly, in such cases, after amination and before application as a coating or film, the halogen anion is exchanged for a suitable, less corrosive anion pursuant to conventional anion exchange reactions.

The use of the radiation-curable polymers of the invention is pursuant to conventional techniques for radiation-curable coatings except that (a) the curable coatings or layers are deposited from aqueous dispersions or emulsions or from aqueous solutions, (b) exposed photo-imagable articles utilizing certain of the polymers of the invention can be developed with water or with dilute aqueous alcohol solutions rather than requiring more expensive, toxic or flammable organic solvents to dissolve the unexposed portion of the layer from the image-forming photocured portion, (c) in the photocuring of the coatings of the inventions need not be done in the absence of oxygen, (d) pre-exposure of photo-imagable coatings without a negative to consume oxygen or other inhibitors is not required, and (e) shorter exposure times and/or less powerful radiation sources can be employed.

In the use of the aforementioned radiation-curable polymers as protective or decorative coatings or as photo-imagable coatings there can be used in conjunction therewith (generally intimately admixed therein) conventional pigments and dyes. In addition the radiation-curable polymers of the invention can be diluted with other compatible water-soluble polymers. Examples of suitable water-soluble polymers include polyoxazolines, poly(methyl vinyl ether), polyvinylpyrrolidone, low molecular weight unhydrolyzed polyacrylamide, polydimethylacrylamide, polyvinyl alcohol, polyamide of adipic acid or diethylenetriamine and the like.

Naturally curable compositions utilizing the radiation-curable polymers of the invention can also contain conventional photosensitizers and photoinitiators such as acetophenone, benzoin methyl ether, isobutyl benzoin ether, and the like.

In addition, compositions utilizing the radiation-curable polymers of the invention can also be rendered curable by heat as well as by radiation by the inclusion in such composition of conventional heat-activated free radical sources such as peroxides, azo catalysts, etc.

The practice of the present invention is further illustrated, but not limited by, the following examples. In such examples when vinylbenzyl chloride is mentioned, an isomeric mixture of 60 weight percent of the meta isomer and 40 weight percent of the para isomer is meant unless otherwise stated.

EXAMPLE 1

Vinylbenzyl chloride-Butadiene Copolymer Aminated with 2-(dimethylamino)ethyl Methacrylamide The ingredients, of the following recipe are added in the amounts shown to a critrate bottle.

Recipe

| | Weight (grams) |
|---|---|
| azo-bis-isobutyroamidine hydrochloride | 1.6 |
| aqueous (50% by weight) solution of alkyl trimethyl ammonium chloride wherein the alkyl groups are 90% dodecyl, 9% tetradecyl, 1% octadecyl | 0.8 |
| dodecyl mercaptan | 0.8 |
| carbon tetrachloride | 8.0 |
| Vinylbenzyl chloride | 40.0 |
| butadiene | 40.0 |
| water (deionized) about | 120.0 |

The citrate bottle is then immersed in a hot water bath which is maintained at about 60° C and the bottle is equipped with a stirrer. Polymerization is then conducted with agitation at about 60° C for about 16 hours. At the end of the polymerization period the contents of the citrate bottle has formed a vinylbenzyl chloride butadiene copolymer latex which is then coagulated with acetone and sodium chloride and redissolved in dioxane without drying.

The copolymer has a weight averaged molecular weight of about 71,000 as determined by Gel Phase chromatography (GPC) in tetrahydrofuran using polystyrene as a standard.

A 22 gram portion of a solution containing 29.4 percent by weight, total weight basis, copolymer in dioxane is then treated with 6.5 grams of 2-(dimethylamino)ethyl methacrylamide.

After a day at room temperature a gel has formed. The resulting gel is dissolved by the addition of water and is then precipitated with acetone containing sodium chloride. The resulting precipitate is recovered by filtration. The treated copolymer thus recovered is soluble in aqueous ethanol and is found to contain 5.6 percent nitrogen by weight.

A printing plate is prepared having a film of the aminated copolymer deposited from aqueous ethanol, exposed under a negative and developed using an aqueous ethanol spray.

EXAMPLE 2

Vinylbenzyl Chloride-Butadiene Copolymer Aminated with 2-(dimethylamino)ethyl Methacrylamide A copolymer of vinylbenzyl chloride and butadiene is prepared pursuant to the procedure of Example 1 with the exception that the polymerization is taken to only 80% conversion. The copolymer thereby formed exhibits a weight averaged molecular weight of about 52,000 as determined by GPC in tetrahydrofuran using a polystyrene calibration curve.

The copolymer is aminated by contacting a 40 gram portion of a dioxane solution containing about 20% by weight, total weight basis, of the copolymer in dioxane at 50° C with a 12 gram portion of 2-(dimethylamino)ethyl methacrylamide and a 0.014 gram portion of diphenylamine as an antioxidant. The amination is performed in a partially filled bottle to permit access to some oxygen. Gradual additions of water are made during the course of the amination to prevent precipitation of the aminated copolymer. After two hours of amination the copolymer exhibits a chloride anion content of about 0.94 milliequivalents of chloride anion per gram of aminated copolymer as determined by titration with silver nitrate.

A printing plate is made from the aminated copolymer and the photocurable layer thus formed is capable of development (i.e., dissolution of the unexposed portion) with water alone if exposure and development are performed before the photocurable layer is fully dried.

EXAMPLE 3

Vinylbenzyl Chloride-Butadiene Copolymer Aminated with 2-(dimethylamino)ethyl Methacrylamide Pursuant to the procedure of Example 1, a vinylbenzyl chloride-butadiene copolymer is prepared by polymerizing a recipe identical to that of Example 1 except that 26.7 grams of vinylbenzyl chloride and 53.3 grams of butadiene monomer are employed. Polymerization is carried out to 85% conversion and the resulting copolymer exhibits a weight averaged molecular weight of about 57,000 as determined by GPC as in Example 1.

The copolymer is then aminated by contacting for two days at 40° C a 10 gram portion of a dioxane solution containing 18.5 weight percent of the copolymer on a total weight basis with 8 grams of 2-(dimethylamino)ethyl methacrylamide and 0.08 gram of diphenylamine. The aminated polymer contains about 1.36 milliequivalents of chloride anion per gram of aminated copolymer as determined by silver nitrate titration.

A printing plate having a photocurable layer of such aminated copolymer is prepared and exposed. Development of the exposed plate is performed with an aqueous alcohol solution.

EXAMPLE 4

Low Molecular Weight Vinylbenzyl Chloride-Butadiene Copolymer Aminated with 2-(dimethylamino)ethyl Methacrylamide A low molecular weight copolymer is prepared pursuant to the procedure of Example 1 except that the polymerization temperature is 66° C and the recipe is changed by reducing the amount of deionized water employed to about 18 grams and by adding about 35 grams of toluene. The polymerization mixture inverts from water-in-oil to oil-in-water during polymerization. The resulting copolymer exhibits a weight averaged molecular weight of about 21,000 as determined by GPC as in Example 1.

The copolymer is then aminated at 40° C for four hours with 2-(dimethylamino)ethyl methacrylamide. The resulting aminated copolymer contains about 2.46 milliequivalents of chloride anion per gram of aminated copolymer as determined by titration with silver nitrate.

A 17 mil layer of the aminated copolymer containing 2% by weight of 2-isobutoxy-2-phenylacetophenone (photoinitiator) is deposited from aqueous solution on a polyester sheet and the resulting printing plate is exposed through a negative for 5 seconds to a 3-tube fluorescent light (3-30 watt tubes F36T12-BL-HO) positioned 1½ inches from the surface of the coating.

The cured plate is readily developed with water at room temperature to produce a photorelief having excellent penetration of the relief between exposed areas.

EXAMPLE 5

Low Molecular Weight Vinylbenzyl Chloride-Butadiene Copolymer Aminated with 2-(dimethylamino) ethyl Methacrylamide A low molecular weight copolymer is prepared pursuant to Example 1 except that the polymerization temperature is 66° C and the recipe is changed by reducing the amount of deionized water employed to about 13 grams. The polymerization mixture inverts from water-in-oil to oil-in-water during polymerization. The resulting copolymer exhibits a weight averaged molecular weight of about 23,000 as determined by GPC as in Example 1.

A 21.3 gram portion of the copolymer is then aminated with stirring at 40° C in a 100 gram portion of a dioxane solution containing 16 grams of 2-(dimethylamino)ethyl methacrylamide and 0.25 gram of diphenylamine as an antioxidant. After two hours a 25 gram portion of water is added and amination is continued overnight. The aminated copolymer is found to contain about 1.77 milliequivalents of chloride anion per gram of aminated copolymer via titration with silver nitrate.

The aminated copolymer is then precipitated with acetone and, without drying, is redissolved in water to give a slightly viscous aqueous solution containing 30% aminated copolymer on a total weight basis.

EXAMPLE 6

Vinylbenzyl Chloride-Butadiene Copolymer Aminated with 2-(dimethylamino)ethyl Methacrylamide as a Protective Metal Coating The vinylbenzyl chloride-butadiene copolymer of Example 1 is aminated with 2-(dimethylamino)ethyl methacrylamide of acetone. The resulting mixture which is alkaline (pH=8) is acidified (to pH 5) with acetic acid. The aminated copolymer is found to contain 0.48 milliequivalent of chloride anion per gram of aminated copolymer via titration with silver nitrate. A coating of the aminated copolymer containing 0.75% by weight on a dry weight basis of benzoin butyl ether as a photoinitiator is applied to a primed steel plate.

The coated plate is then passed at 100 feet per minute under a bank of three medium pressure mercury lamps (100 watt/inch) and then under a high pressure mercury arc (200 watt/inch), thereby exposing the coating to 0.071 watt second per square centimeter at 3650 Angstroms per pass. Two passes provide a non-tacky surface and three passes provide a cured coating having good adhesion.

The cured coating exhibits some flaking under a reverse impact test at 10 foot pounds and is affected by salt spray.

The cured coating is unaffected by exposure to methyl ethyl ketone.

EXAMPLE 7

Vinylbenzyl Chloride-Isobutylene Copolymer Aminated with 2-(dimethylamino)ethyl Methacrylamide To a resin pot equipped with a stirrer, dry ice condenser, and thermometer is added 100 ml of a 60:40 weight percent mixture of m- and p-vinylbenzyl chloride, 200 ml of isobutylene and 100 ml of methylene chloride.

The temperature of the resulting reaction mixture is adjusted to −60° C and BF₃ gas is then introduced to the mixture. The temperature of the reaction mixture rises spontaneously to +20° C and the reaction is quenched.

The resulting reaction product is a sticky resin which is partially soluble in dioxane. The remainder is soluble in toluene.

The dioxane soluble material is aminated with 2-(dimethylamino)ethyl methacrylamide and is dissolved in water to give a turbid solution. A coating of such solution dries to a clear film which is non-tacky and sufficiently hard for a printing plate coating. After exposure under a negative the unexposed portion washes out very quickly with water but the image is not sharp. Examination with a lens reveals the presence of striations, indicating the existence of two polymer phases.

EXAMPLE 8

Vinylbenzyl Chloride-Propylene Copolymer Aminated with 2-(dimethylamino)ethyl Methacrylamide Pursuant to the procedure of and in the apparatus of Example 7, 100 ml of vinylbenzyl chloride and 150 ml of propylene are mixed with 100 ml methylene chloride at −47° C in a cooling bath. Boron trifluoride is absorbed into the solution and the temperature rises to −42° C and remains there while propylene refluxes from the dry ice condenser. The solution turns orange and it is allowed to warm to room temperature overnight with stirring.

The solution is then precipitated with methanol to give, after drying, 95 grams of white powder melting 60° C.

A sample of the white powder is aminated with 2-(dimethylamino)ethyl methacrylamide in dioxane. Water is added incrementally and the solution stirred overnight at 50° C with diphenylamine inhibitor and with access to air. The solution is then concentrated under reduced pressure and precipitated with acetone to give 33.5 grams of white powder having about 2.74 milliequivalents of chloride anion per gram of powder as determined by titration with silver nitrate.

A film of the aminated copolymer is deposited on a metal substrate to form a photoresist plate. The resulting film is turbid. After exposure through a negative, the unexposed portion washes out quickly with water and the remaining image (i.e., the exposed portion) exhibits good shoulders, giving added strength to isolated small elements of the image, such as dots.

EXAMPLE 9

Vinylbenzyl Chloride-Isobutylene Copolymer Aminated with 2-(dimethylamino)ethyl Methacrylamide In the apparatus of Example 7 a solution of 50 ml vinylbenzyl chloride in 100 ml methylene chloride is saturated with about 50 ml isobutylene at −20° C. Boron trifluoride gas is introduced to the solution and the copolymerization solution exotherms to 43° C despite circulating coolant in the reaction vessel jacket. Precipitation of the resulting copolymer with methanol yields 55 grams of a low melting solid which can be powdered.

A 10 gram portion of the polymer is aminated in 50 grams of dioxane with 7.5 grams of 2-(dimethylamino)ethyl methacrylamide and 0.1 gram diphenylamine at 50° C. The resulting aminated polymer is a low melting solid which is soluble in water and insoluble in methanol and which can be powdered.

EXAMPLES 10-12

Vinylbenzyl Chloride-Styrene-Butadiene Terpolymers Aminated with 2-(dimethylamino)ethyl Methacrylamide The following recipes are reacted to form terpolymers and are aminated, both pursuant to the procedure of Example 1.

| Ingredient | Parts by Weight Example | | |
|---|---|---|---|
| | 10 | 11 | 12 |
| Bromotrichloromethane | 0.8 | 0.8 | 8.0 |
| Carbon tetrachloride | None | 8.0 | 0.8 |
| Dodecylmercaptan | 0.8 | None | 0.8 |
| Azo-bis-isobutyroamidine hydrochloride | 1.6 | 1.6 | 1.6 |
| Arquad 12–50% solution | 0.8 | 0.8 | 0.8 |
| Vinylbenzyl choride | 20 | 20 | 20 |
| Styrene | 20 | 20 | 20 |
| Butadiene | 40 | 40 | 40 |
| Deionized water | 120 | 120 | 120 |
| Product Molecular Weight | 225,000 | 151,000 | 77,200 |
| Milliequivalents of chloride anion per gram of aminated polymer | 0.47 | 0.45 | 0.8 |

Coated plates having the three different polymers as the photocurable layer are prepared and exposed through a negative.

The exposed layers of all three polymers are unaffected by a spray composed of Formula 30 alcohol containing 10% acetone by weight, total weight basis.

EXAMPLE 13

Vinylbenzyl chloride-Butadiene Copolymer Aminated with 2-(dimethylamino)ethyl Methacrylate Pursuant to the procedure of Example 1 a 50:50 (weight basis) copolymer of vinylbenzyl chloride and butadiene is prepared and aminated, in the presence of water, with 2-(dimethylamino)ethyl methacrylate to provide a water-soluble aminated copolymer.

A coating of the aminated copolymer is prepared and photocured through a negative.

The rate of curing is observed to be relatively slow, presumably by virtue of hydrolysis of the 2-(dimethylamino)ethyl methacrylate during amination.

EXAMPLE 14

Vinylbenzyl Chloride-Butadiene Copolymer Aminated with Trimethylamine and Converted to a Salt of Acrylic Acid A 50:50 weight ratio vinylbenzyl chloride-butadiene copolymer having a weight averaged molecular weight of about 53,000 is prepared (and its molecular weight determined) pursuant to Example 1.

A portion of the copolymer is then dissolved in dioxane to form a 30 gram portion of a dioxane solution containing 21% of such copolymer by weight, total weight basis. The dioxane-copolymer solution is then aminated, with stirring, with an excess of a 25 weight percent aqueous trimethylamine solution for 3 hours at room temperature (about 25° C) and then for one hour at 50° C.

The resulting aminated copolymer is precipitated with acetone, redissolved in water and passed through a column containing 60 cubic centimeters of a strong base anion exchange resin (commercially available as Dowex 1 ® a product of The Dow Chemical Company) in hydroxide anion form. The effluent is then neutralized with acrylic acid and concentrated under reduced pressure.

A small amount of 2-isobutoxy-2-phenylacetophenone is added as a photoinitiator to the concentrated aqueous copolymer solution and about a 20 mil coating of the copolymer is formed, by air drying in the dark, on a glass plate.

The resulting coating is then exposed to fluorescent light through a mask of black paper. The exposed coating is then rinsed with water. There is differential swelling and leaching of soluble polymers from the masked areas and on drying the image of the exposed areas is seen as raised portions.

In like manner a thin layer of the copolymer is formed on a glass plate and exposed to fluorescent light through a negative. The copolymer layer images and the unexposed portion washes out with a water rinse.

EXAMPLE 15

Reduction of Vinylbenzyl Chloride-Butadiene Elastomer Molecular Weight by Exposure to Ozone Pursuant to the procedure of Example 1 a 40:60 weight basis vinylbenzyl chloride-butadiene copolymer is prepared. The weight averaged molecular weight of the resulting copolymer is determined to be about 28,000 via GPC in tetrahydrofuran using polystyrene standards.

A 30 gram portion of a dioxane solution containing about 19 weight percent (total weight basis) of the copolymer is then treated by passing a stream of ozonized air (about 0.13 milliequivalent ozone per minute) through the dioxane solution with stirring and at about 40° C for one hour.

The molecular weight (weight averaged) of the ozonized copolymer is then redetermined by GPC in tetrahydrofuran and is found to have been reduced to about 13,000 based upon polystyrene standards.

EXAMPLES 16 and 17

Vinylbenzyl Chloride-Butadiene Elastomeric Mesomers Using Aryl Mercaptan Chain Transfer Agents A 50:50 weight basis copolymer of vinylbenzyl chloride and butadiene is prepared pursuant to the polymerization procedure of Example 1 except that in Example 16, a 0.8 gram portion of benzyl mercaptan is used in place of dodecyl mercaptan and in Example 17, a 0.8 gram portion of 3,4-dichlorobenzyl mercaptan is used in place of dodecyl mercaptan.

The weight averaged molecular weights of the resulting copolymers are determined by GPC in tetrahydrofuran using polystyrene calibration curves.

The weight averaged molecular weight thereby found for the copolymer of Example 16 is about 6,600.

The weight averaged molecular weight found for the copolymer of Example 17 is about 38,000.

While the present invention has been described with reference to particular embodiments, such embodiments are not to be understood as limiting the scope of the instantly claimed invention.

What is claimed is:

1. A radiation-curable polymer which is soluble in water or in dilute aqueous alcohol solutions and which comprises a base polymer (a) which base polymer has a weight average molecular weight of from about 5,000 to about 50,000 and comprises an olefin monomer addition polymerized with an active halogen monomer wherein the active halogen monomer is an addition polymerizable ethylenically unsaturated monomer which, after polymerization, provides a pendant halomethyl group capable of being aminated by a tertiary amine and (b) which base polymer has pendantly bonded thereto at least about 1.0 milliequivalent of a polymerizable or non-polymerizable quaternary nitrogen moiety per gram of said radiation-curable polymer, with the proviso that said base polymer has pendantly bonded thereto, per gram of said radiation-curable polymer, from about 0.4 to about 3 milliequivalents of a polymerizable quaternary nitrogen in the form of a moiety of the formula

wherein each R' is individually a lower alkyl radical or a lower hydroxyalkyl radical or two R' radicals collectively are a divalent radical that is joined with the nitrogen atom to form a 5 or 6 membered heterocyclic ring which may contain an atom of oxygen non-adjacent to the nitrogen atom; each R" is individually a lower alkyl radical, a lower hydroxyalkyl radical or an unsaturated organic radical of the formula

wherein R is hydrogen or methyl and Q is a divalent aliphatic radical; X is a neutralizing inorganic anion, a neutralizing saturated organic anion, or a neutralizing organic anion containing acryloyl unsaturation; and m is 1 or 2; with the proviso that either R" is said unsaturated organic radical or X is said neutralizing organic anion containing acryloyl unsaturation.

2. The radiation-curable polymer of claim 1 wherein the R" radical is a lower alkyl or a lower hydroxyalkyl radical; X is the anion of acrylic or methacrylic acid; and m is 1.

3. The radiation-curable polymer of claim 1 wherein the R" radical is an unsaturated organic radical of the formula

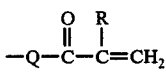

wherein R is hydrogen or methyl and Q is a divalent aliphatic radical; and wherein X is a neutralizing inorganic anion or a neutralizing saturated organic anion.

4. The radiation-curable polymer of claim 3 wherein the divalent aliphatic radical is selected from the group consisting of $+CH_2+_n$, $+CH_2+_nCH_2-NH-$, $+CH_2+_nCH_2-O-$, $-CH_2-CH(OH)-CH_2-NH-$, $+CH_2+_nCH_2-O-CH_2-$, $+CH_2+_nNH-$, $-CH_2-CH_2-CH=CH-CH_2-$, and $+CH_2-CH(R)-C(O)-NH-CH_2-NH-$; and wherein n is a positive integer and R is hydrogen or methyl.

5. The radiation-curable polymer of claim 1 wherein the quaternary nitrogen is in the form of a moiety of the formula

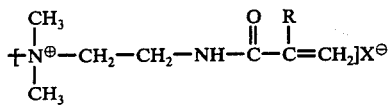

wherein R is hydrogen or methyl and X is halogen anion.

6. The radiation-curable polymer of claim 1 wherein the base polymer comprises at least about 40 weight percent of an olefin monomer having from 3 to 5 carbon atoms and between about 2.4 and about 6.0 milliequivalents per gram of said base polymer of an active halogen monomer selected from the group consisting of vinylbenzyl halide, isopropenylbenzyl halide and 2-halomethyl-1,3-butadiene and wherein the X substituent of the pendant quaternary nitrogen moiety of the formula (III) is the halogen of the active halogen monomer and m of such formula is 1.

7. The radiation-curable polymer of claim 6 wherein the olefin monomer is an alkadiene.

8. The radiation-curable polymer of claim 6 wherein the olefin monomer is butadiene.

9. The radiation-curable polymer of claim 6 wherein the olefin monomer is isoprene.

10. The radiation-curable polymer of claim 1 which is water-soluble and which comprises at least about 1.5 milliequivalents of a polymerizable or non-polymerizable quaternary nitrogen moiety per gram of said radiation-curable polymer.

11. The water-soluble radiation-curable polymer of claim 10 wherein the base polymer has a weight averaged molecular weight of from about 5,000 to about 35,000.

12. The water-soluble radiation-curable polymer of claim 10 which comprises from about 1.5 to about 3.0 milliequivalents of the polymerizable quaternary nitrogen moiety of the formula (III) per gram of said rdiation-curable polymer.

13. The water-soluble radiation-curable polymer of claim 10 wherein the base polymer comprises at least about 40 weight percent of an olefin monomer having from 3 to 5 carbon atoms and at least about 2.4 milliequivalents per gram of said base polymer of an active halogen monomer selected from the group consisting of vinylbenzyl halide, isopropenylbenzyl halide and 2-halomethyl-1,3-butadiene and wherein the X substituent of the pendant quaternary nitrogen moiety of the formula (III) is the halogen of the active halogen monomer and m of such formula is 1.

14. An aqueous solution comprising the water-soluble radiation-curable polymer of claim 13.

15. The radiation-curable polymer of claim 1 wherein the base polymer has a weight average molecular weight of from about 5,000 to about 35,000 and comprises, based upon the total base polymer weight, (a) from about 40 to about 90 weight percent of an olefin monomer containing from 3 to 5 carbon atoms, (b) from about 10 to about 60 weight percent of an active halogen monomer selected from the group consisting of vinylbenzyl halides, isopropenylbenzyl halides and 2-halomethyl-1,3-butadiene and (c) from 0 to about 20 weight percent of an ethylenically unsaturated monomer selected from the group consisting of styrene, acrylonitrile, acrylic acid, methacrylic acid, esters of acrylic acid or methacrylic acid, acrylamides and methacrylamides.

16. The radiation-curable polymer of claim 1 wherein X is a neutralizing inorganic anion, a neutralizing saturated organic anion or a neutralizing α,β-ethylenically unsaturated organic anion selected from the group consisting of anions of α,β-ethylenically unsaturated carboxylic acids, anions of esters or amides of α,β-ethylenically unsaturated carboxylic acids with, respectively, sulfoalkyl alcohols or sulfoalkylamines, and monoesters of dicarboxylic acids with hydroxyalkyl acrylates or with hydroxyalkyl methacrylates.

* * * * *

UNITED STATES PATENT AND TRADEMARK OFFICE
CERTIFICATE OF CORRECTION

PATENT NO. : 4,112,207  
DATED : September 5, 1978  
INVENTOR(S) : Giffin D. Jones It is certified that error appears in the above-identified patent and that said Letters Patent are hereby corrected as shown below:

Column 1, line 41, delete "emuslions" and insert --emulsions--.

Column 1, line 64, delete "requirement" and insert --requirements--.

Column 2, line 19, delete "developemnt" and insert --development--.

Column 2, line 21, delete "substrate" and insert --substrates--.

Column 4, line 36, delete "postive" and insert --positive--.

Column 5, line 27, delete "aminiation" and insert --amination--.

Column 6, line 64, delete "application" and insert --applications--.

UNITED STATES PATENT AND TRADEMARK OFFICE
CERTIFICATE OF CORRECTION

PATENT NO. : 4,112,207

DATED : September 5, 1978

INVENTOR(S) : Giffin D. Jones

It is certified that error appears in the above-identified patent and that said Letters Patent are hereby corrected as shown below:

Column 7, line 25, delete "1pentene" and insert --1-pentene--.

Column 8, line 29, delete "etc1" and insert --etc.--.

Column 10, line 2, delete "commmon" and insert --common--.

Column 12, line 6, delete "critrate" and insert --citrate--.

Column 18, line 63, delete "$_2-CH_2-CH=CH-CH_2-$" and insert --$_2-CH=CH-CH_2-$--.

Column 19, line 8, before "halogen" insert --a--.

Column 20, line 1, delete "rdia-" and insert --radia- --.

Signed and Sealed this

Nineteenth Day of June 1979

[SEAL]

Attest:

RUTH C. MASON
*Attesting Officer*

DONALD W. BANNER
*Commissioner of Patents and Trademarks*